(No Model.)

C. VOORHIES.
BED PAN.

No. 586,749. Patented July 20, 1897.

Witnesses
H. H. Mills
C. J. Stagg

Inventor
Catharine Voorhies
by Eugene Diven
Attorney

UNITED STATES PATENT OFFICE.

CATHARINE VOORHIES, OF ELMIRA, NEW YORK.

BED-PAN.

SPECIFICATION forming part of Letters Patent No. 586,749, dated July 20, 1897.

Application filed January 14, 1897. Serial No. 619,188. (No model.)

*To all whom it may concern:*

Be it known that I, CATHARINE VOORHIES, a citizen of the United States, residing at Elmira, in the county of Chemung and State of New York, have invented certain new and useful Improvements in Bed-Pans, of which the following is a specification.

My invention relates to improvements in bed-pans of the form now in common use, and has for its objects, first, to so fashion the pan that it may be used as a urinal by male as well as female patients, and, second, to supply such a pan with a pad or cushion upon which the back of the patient may rest, and which pad shall be held securely in proper position on the pan and against displacement while adjusting or removing the pan.

In bed-pans as now made the male patient when he has occasion to use the pan is also obliged to call upon the nurse for a separate vessel for urinal purposes, as the pan is not adapted for such use. It is my aim, therefore, to dispense with this separate urinal and its attendant inconvenience by fashioning the pan in such a manner that the patient can readily adjust himself, without the aid of the nurse, to use it as a urinal in addition to its ordinary function. While constructing the pan with this end in view, I also provide it with means whereby a pad or cushion may be securely attached thereto. Pads have been designed for attachment to bed-pans of this type, but so far as I am aware the pan itself has never been altered so as to provide a more secure means for attaching the pads, and those pads with which I am acquainted are apt to slip and become displaced.

I attain the objects of my invention by the devices shown in the accompanying drawings, in which—

Figure 1:
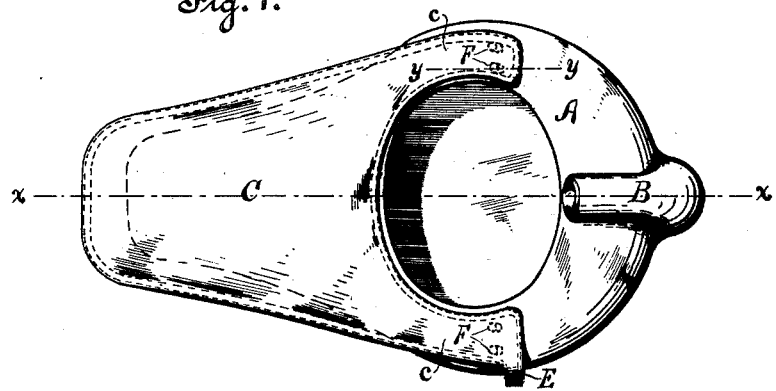
Figure 2:
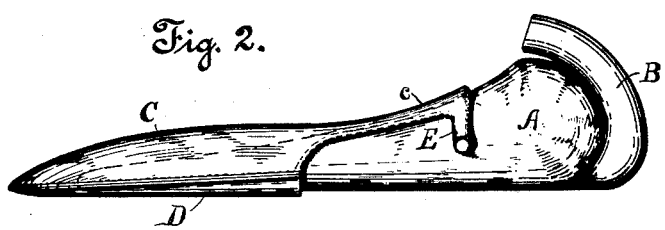
Figure 3:
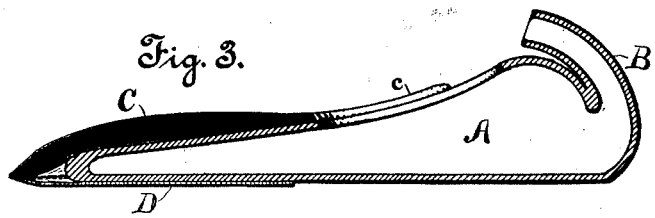
Figure 4:
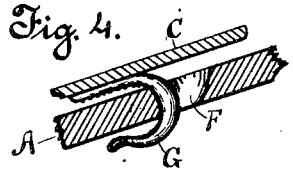

Figure 1 is a plan view of my improved bed-pan and pad; Fig. 2, a side elevation; Fig. 3, a section on the line *x x* in Fig. 1, and Fig. 4 a detail section on line *y y* in Fig. 1.

Similar letters refer to similar parts throughout the several views.

A represents the bed-pan, at the head of which is the neck B, which opens into the bottom of the pan and extends thence upwardly, following the curve of the pan, to its top, where the extremity of the neck is in such position that the opening thereto is within reach of the male patient for urinal purposes when reclining on the pan. Heretofore this neck has been carried up but a short distance from the bottom of the pan and has been used solely as an outlet through which to empty the pan of its contents. As I form the neck it serves as a urinal and also as an outlet for emptying the pan. For the latter purpose I enlarge the base of the neck and make it quite broad where it opens into the pan, in order that when the pan is tipped up the contents will readily flow into this base portion, and thence, upon a further tipping of the pan, out through the neck.

On the top of the bed-pan, at the sides of its aperture, I provide pairs of holes F F, into which are to be inserted hooks G, attached to the under side of the arms *c c* of the pad C. This pad is made of sheet-rubber and is double-walled, so that it may be inflated with air or filled with warm or cold water, as may be desirable. The pad is cut at the top to conform to the shape of the aperture of the pan, the arms *c c* extending up at either side of the aperture and beyond the holes F, so as to cover them and protect the patient from the hooks G, which are set back a proper distance from the ends of the arms. By forming the pad in this way an effective cushion is interposed between the pan and the patient where he rests most heavily on the pan, and he is enabled, though sore from lying in bed, to use the pan with comfort. I prefer to make the pad of rubber, as it is then most easily washed and disinfected. On the under side of the pad is formed a pocket D, into which the point of the bed-pan is slipped. From one of the arms of the pad extends a tube E, supplied with a suitable filler plug or valve, through which the pad may be filled with air or water. The holes F are preferably elliptical in shape at the top or outside of the pan and taper inwardly on their upper sides, so that the hooks G may be readily inserted and yet fit as closely as possible. When the pad is deflated, it is an easy matter to insert the point of the pan in the pocket and hook the arms *c c* into the holes F F, but when the pad has been filled with air or water the slack is taken up all around and the pad is held snugly and securely to the pan by means of the pocket and hooks. There may be but one hook on each arm, but I prefer to use the hooks in pairs, as by this arrangement the arms of the pad are held more firmly to the pan and prevented from becoming twisted out of place.

I am aware that heretofore pads for bedpans have been made with double walls for filling them with air or water, and that such pads have also been supplied with a pocket to receive the point of the pan, and I do not claim this as my invention.

What I do claim as my invention, and desire to secure by Letters Patent, is—

1. As a new article of manufacture, a bedpan provided at its head with a supplemental channel extending forward over the head, with its mouth in a position adapting it for use in the manner and for the purpose set forth.

2. The combination of a bed-pan provided with a hole or holes at each side of its aperture, and a pad or cushion provided with a pocket to receive the point of the pan and with arms extending up the sides of the pan, said arms being supplied with hooks adapted to engage said holes, substantially as described.

In testimony whereof I have affixed my signature in presence of two witnesses.

CATHARINE VOORHIES.

Witnesses:
H. H. MILLS,
C. TRACEY STAGG.